(12) United States Patent
Beuterbaugh et al.

(10) Patent No.: US 10,920,125 B2
(45) Date of Patent: Feb. 16, 2021

(54) TREATMENTS IN SUBTERRANEAN FORMATIONS USING DEGRADABLE POLYMERS IN ORGANIC SOLVENTS

(71) Applicant: Halliburton Energy Services, Inc., Houston, TX (US)

(72) Inventors: Aaron Michael Beuterbaugh, Spring, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 64 days.

(21) Appl. No.: 16/095,550

(22) PCT Filed: Jun. 3, 2016

(86) PCT No.: PCT/US2016/035824
§ 371 (c)(1),
(2) Date: Oct. 22, 2018

(87) PCT Pub. No.: WO2017/209768
PCT Pub. Date: Dec. 7, 2017

(65) Prior Publication Data
US 2020/0048528 A1     Feb. 13, 2020

(51) Int. Cl.
*C09K 8/502*     (2006.01)
*E21B 33/138*     (2006.01)
(Continued)

(52) U.S. Cl.
CPC ............... *C09K 8/502* (2013.01); *C09K 8/72* (2013.01); *E21B 33/138* (2013.01); *E21B 43/26* (2013.01)

(58) Field of Classification Search
CPC ..... C09K 8/52; C09K 8/74; C09K 8/68; C09K 8/72; C09K 8/76; C09K 8/516;
(Continued)

(56) References Cited

U.S. PATENT DOCUMENTS 7,021,379 B2  4/2006 Nguyen
7,036,587 B2  5/2006 Munoz, Jr. et al.
(Continued)

FOREIGN PATENT DOCUMENTS

WO     2011/007132 A1    1/2011

OTHER PUBLICATIONS

International Search Report and Written Opinion issued in related PCT Application No. PCT/US2016/035824 dated Mar. 2, 2017, 11 pages.
(Continued)

*Primary Examiner* — Zakiya W Bates
(74) *Attorney, Agent, or Firm* — Thomas Rooney; Baker Botts L.L.P.

(57) ABSTRACT

Systems and methods for the use of degradable polymers that are dissolved and/or plasticized in an organic solvent in subterranean treatments. In some embodiments, the methods comprise: providing a treatment fluid that comprises at least one organic solvent and one or more degradable polymers, wherein the treatment fluid does not comprise a significant amount of solid material comprising the one or more degradable polymers; introducing the treatment fluid into a well bore penetrating at least a portion of a subterranean formation; and contacting the treatment fluid with one or more aqueous fluids to form a solid precipitate comprising the one or more degradable polymers in the portion of the subterranean formation.

20 Claims, 2 Drawing Sheets

(51) Int. Cl.
*E21B 43/26* (2006.01)
*E21B 43/22* (2006.01)
*C09K 8/72* (2006.01)

(58) Field of Classification Search
CPC ... C09K 2208/08; E21B 43/26; E21B 43/627; E21B 33/138
See application file for complete search history.

(56) References Cited

U.S. PATENT DOCUMENTS

| | | |
|---|---|---|
| 7,648,946 B2 | 1/2010 | Munoz, Jr. |
| 8,016,040 B2 | 9/2011 | Ali et al. |
| 8,697,612 B2 | 4/2014 | Todd et al. |
| 8,853,137 B2 | 10/2014 | Todd et al. |
| 2005/0167105 A1 | 8/2005 | Roddy et al. |
| 2006/0283591 A1 | 12/2006 | Willberg et al. |
| 2007/0078064 A1 | 4/2007 | Munoz, Jr. et al. |
| 2007/0298977 A1 | 12/2007 | Mang et al. |
| 2008/0070810 A1 | 3/2008 | Mang |
| 2008/0139412 A1 | 6/2008 | Fuller |
| 2009/0075845 A1* | 3/2009 | Abad ............... C09K 8/12 507/117 |
| 2010/0212906 A1 | 8/2010 | Fulton et al. |
| 2017/0298265 A1 | 10/2017 | Smith et al. |
| 2018/0127882 A1 | 5/2018 | Reyes et al. |

OTHER PUBLICATIONS

IP.com Prior Art Database Technical Disclosure. "Degradation of Polyester Diverting Agents with Sodium Hydroxide", Authors et. al.: Disclosed Anonymously, IP.com No. IPCOM000245885D, Apr. 15, 2016, 10 pages.

* cited by examiner

TREATMENTS IN SUBTERRANEAN FORMATIONS USING DEGRADABLE POLYMERS IN ORGANIC SOLVENTS

CROSS-REFERENCE TO RELATED APPLICATION

The present application is a U.S. National Stage Application of International Application No. PCT/US2016/035824 filed Jun. 3, 2016, which is incorporated herein by reference in its entirety for all purposes.

BACKGROUND

The present disclosure relates to systems and methods for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Diverting agents also may be used in many such subterranean treatments. For example, after a well bore is drilled and completed in a subterranean producing zone, it is often necessary to introduce a treatment fluid into the zone. For example, a producing zone can be stimulated by introducing an aqueous acid solution into the matrix of a producing zone to dissolve formation material or materials near the wellbore which impede well productivity, and thereby increase its porosity and permeability. This results in an increase in the production of hydrocarbons therefrom. To insure that the producing zone is contacted by the treating fluid uniformly, a particulate solid diverting agent may be placed in the zone to direct the placement of a desired treatment fluid. One technique has been to pack the diverting agent in perforation tunnels extending from the well bore into the subterranean zone. The diverting agent in the perforation tunnels causes the treating fluid introduced therein to be uniformly distributed between all of the perforations whereby the subterranean zone is uniformly treated. The term "zone," as used herein, simply refers to a portion of the formation and does not imply a particular geological strata or composition.

Particulate diverting agents often are suspended in a carrier fluid, and this fluid is introduced to the subterranean formation during the stimulation treatment in order to place the diverting agent in the desired portion of the formation. However, maintaining the suspension of the particulate diverting agents in the fluid can be challenging both as the fluid passes through the formation and/or well bore and equipment such as tubulars, joints, valves, pumps, and the like. In some instances, special equipment (e.g., pumps) may be required to transport a fluid having the solid particulates suspended therein, as such particulates can obstruct flow paths and/or cause damage in certain types of pumping equipment. Moreover, if the particulate diverting agents settle out of the fluid prematurely, they may not reach the desired portion of the formation, which may jeopardize the effectiveness of subsequent treatments.

BRIEF DESCRIPTION OF THE DRAWINGS

These drawings illustrate certain aspects of some of the embodiments of the present disclosure, and should not be used to limit or define the claims.

Figure 1:
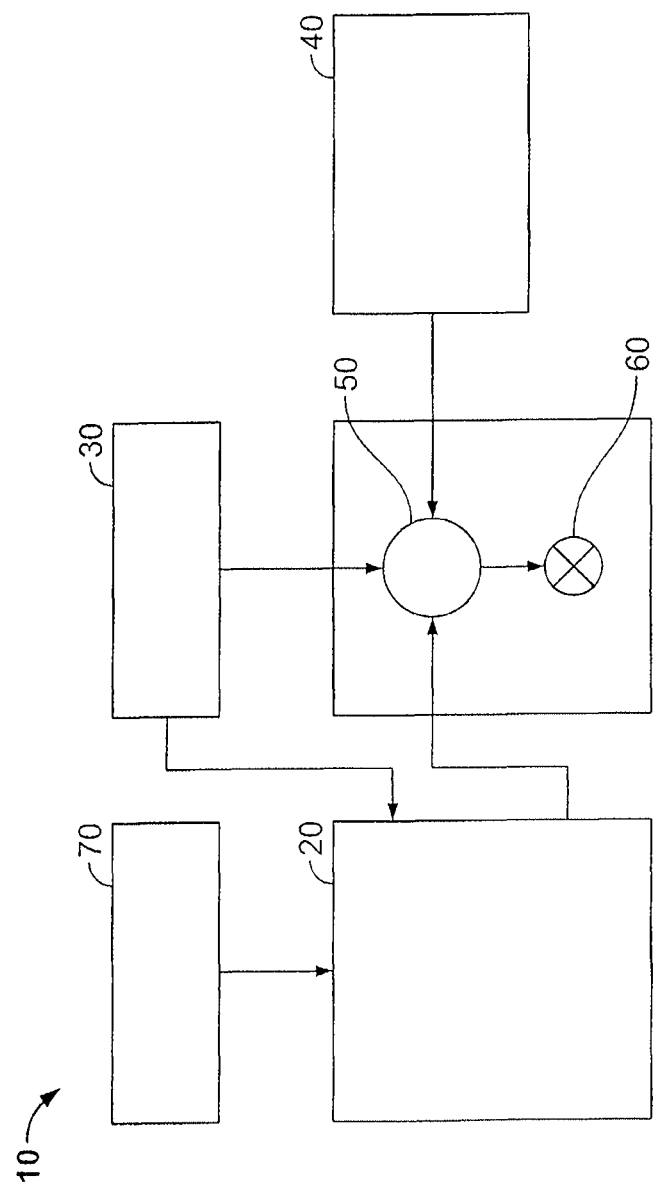
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for the use of degradable polymers that are dissolved and/or plasticized in an organic solvent in subterranean treatments.

The present disclosure provides methods and systems for the delivery and use of degradable polymers as diverting agents in various treatments in subterranean formations. In the methods and systems of the present disclosure, one or more degradable polymers are provided in a treatment fluid comprising at least one organic solvent that alters or maintains the physical state of the degradable polymer (e.g., substantially dissolves and/or plasticizes the degradable polymer) such that the treatment fluid does not comprise a significant amount of solid material comprising the degradable polymer. In certain embodiments, the treatment fluid may be substantially or entirely free of solid material (e.g., particulates) comprising the degradable polymer. In certain embodiments, the treatment fluid also may not comprise a significant amount of (e.g., may be substantially or entirely free of) aqueous fluids such as water. The treatment fluid comprising the degradable polymer and organic solvent is introduced into at least a portion of a subterranean formation, and at some point subsequent to its introduction into the formation, is contacted with an aqueous fluid. Once contacted by the aqueous fluid in the formation (which may occur in any area in the formation matrix, fractures within the formation, a well bore penetrating a portion of the formation, and/or any near wellbore areas in the formation), the degradable polymer becomes insoluble in the aqueous fluid, forming a solid precipitate in the formation that comprises the degradable polymer. The solid precipitate may serve one or more purposes for treatments performed in the subterranean formation, including but not limited to fracturing treatments, acidizing treatments, scale dissolution/removal treatments, drilling operations, and the like. In these treatments, the solid precipitate may serve as one or more of a diverting agent, a bridging agent, a fluid loss control agent, a filter cake (e.g., a layer of solid material in the well bore (e.g., in an annular space in the well bore or within a casing or liner disposed in the well bore)), a propping agent, an isolation plug/mechanism, and/or the like. In certain embodiments, the degradable polymer optionally may be allowed to partially or substantially degrade after the solid precipitate has been formed and used.

Among the many potential advantages to the methods, compositions, and systems of the present disclosure, only some of which are alluded to herein, the methods, compositions, and systems of the present disclosure may provide a more effective and/or efficient means of providing particulate solids such as solid diverting agents in a formation, using a degradable polymer in a non-solid form as a precursor for those materials. In certain embodiments, the methods and compositions of the present disclosure may reduce or prevent the risk of damage to surface equipment (e.g., pumps, valves, etc.) that solid particulates can cause when passing through that equipment. In certain embodiments, the solid precipitate formed using the methods and systems of the present disclosure may be degradable, facilitating the removal of that material from a well bore and/or formation after its use. In certain embodiments, the methods and systems of the present disclosure may enable the use of certain degradable materials as diverting agents in subterranean treatments without the need to coat those materials in a resin or other protective coating. In certain embodiments, the methods and systems of the present disclosure may reduce the mass of polymer particulate that must be pumped into the formation, which in turn may increase the efficiency of the treatment. In certain embodiments, the methods and systems of the present invention may reduce the total volume of water needed to place particulates in a subterranean formation. For example, in conventional treatments, fluids may be able to carry a maximum concentration of 5.5 pounds of particulates per gallon of fluid when pumped into and through a subterranean formation. By carrying particulate precursors that later form particulates in the subterranean formation, smaller volumes of fluid may be required to place a given amount of particulate in the formation using certain methods and systems of the present disclosure.

The degradable polymers used in the methods and systems of the present disclosure may comprise any polymeric material that is insoluble in water and capable of degrading due to, inter alia, chemical and/or radical process such as hydrolysis, oxidation, enzymatic degradation, or UV radiation. The rates at which such polymers degrade may be dependent on the type of repetitive unit, composition, sequence, length, molecular geometry, molecular weight, morphology (e.g., crystallinity), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like. The degradable polymers may include homopolymers, copolymers (e.g., random, block, graft, and star- and/or hyper-branched), and/or any combination thereof.

Examples of degradable polymers that may be suitable in accordance with certain embodiments of the present disclosure include but are not limited to, polysaccharides (e.g., dextran or cellulose), chitin, chitosan, proteins, orthoesters, aliphatic polyesters, polylactic acid or poly(lactides) (PLA), poly(glycolides), poly(ε-caprolactones), poly(hydroxybutyrates), poly(anhydrides), aliphatic polycarbonates, poly(orthoesters), poly(amino acids), poly(ethylene oxide), polyphosphazenes, any derivatives thereof, any copolymers thereof, and any combinations thereof. The lactide monomer exists generally in three different forms: two stereoisomers L- and D-lactide and racemic D,L-lactide (meso-lactide). The oligomers of lactic acid, and oligomers of lactide are defined by the formula:

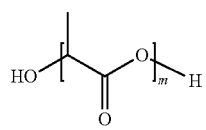

where m is an integer: 2≤m≤75. In certain embodiments, m is an integer: 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined in accordance with the present invention. Additionally, they may be copolymerized with, for example, glycolide or other monomers like δ-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters.

The treatment fluids used in the methods and systems of the present disclosure may comprise any organic solvent (or mixture thereof) known in the art that is substantially free of aqueous fluids and is capable of adequately dissolving (e.g., substantially or mostly dissolving), plasticizing, or otherwise interacting with the degradable polymers discussed herein to convert and/or maintain the degradable polymers in a non-solid state. In certain embodiments, the organic solvent may be capable of fully dissolving the degradable polymer, or may be capable of dissolving at least about 98% w/v of the degradable polymer. Examples of organic solvents that may be suitable in certain embodiments of the present disclosure include, but are not limited to, acetonitrile, dichloromethane, trifluoroacetic acid, dimethylformamide, acetone, chloroform, hexafluoro-2-propanol, dioxane, any derivative thereof, and any combination thereof. In certain embodiments, one or more of the organic solvents may dissolve or plasticize the degradable polymer when heated to a particular temperature. In certain embodiments, the organic solvent(s) carrying the degradable polymer may be incorporated into a mixture of one or more fluids and/or gases, including but not limited to emulsions, foams, and the like, as long as any aqueous phase in that mixture does not interact with the degradable polymer prior to its introduction into the subterranean formation. However, in certain embodiments, the organic solvent may be at least partially miscible with water (e.g., either in a static state or when subjected to shear), among other reasons, in order to decrease solvation and/or facilitate contacting of the degradable material with water at the desired time. The degree of miscibility of the organic solvent with water may be selected, among other purposes, to control the rate or time at which the degradable polymer forms a solid precipitate after introducing the treatment fluid into the subterranean formation.

The degradable polymer may be mixed with the organic solvent in any concentration in which it can be dissolved, plasticized, or otherwise rendered to a non-solid state by the solvent. In certain embodiments, the degradable polymer may be present in a 1:1 ratio by weight with the organic solvent. In some embodiments, the degradable polymer may be present in an amount of from about 0.1% to about 30% by weight of the organic solvent. In some embodiments, the degradable polymer may be present in an amount of from about 1% to about 20% by weight of the organic solvent. In some embodiments, the degradable polymer may be present in an amount of from about 2% to about 5% by weight of the organic solvent. In other embodiments, higher amounts of the degradable polymer may be included in the organic solvent. For example, in some embodiments, the degradable polymer may be present in an amount of more than 50% by weight of the organic solvent. In these embodiments, the higher concentrations of the degradable polymer may, among other things, increase the viscosity of the organic solvent. In some embodiments, the degradable polymer may be present in an amount of up to about 80% by weight of the organic solvent. The concentration of degradable polymer suitable for a particular embodiment of the present disclosure may vary based on a number of factors. For example, in some embodiments, the concentration of the degradable polymer also may be limited if sufficiently high concentrations undesirably increase the viscosity and/or density of the organic solvent, making it difficult or impractical to pump.

When dissolved and/or plasticized in the organic solvent, the degradable polymer may be a shapeless or "zero shape" material. However, the solid precipitate comprising the degradable polymer formed when the polymer is contacted by water may be of any regular or irregular shape, and may comprise a plurality of discrete particles of any shape or size, or may form a cumulative mass. Examples of shapes that the solid precipitate may form include but are not limited to particles (e.g., spherical, cylindrical), discs, pellets, flakes, fibers, strings, films, clusters, and the like. In some embodiments, the solid precipitate may be of a shape similar to that of a space in the subterranean formation (e.g., a pore space) that the organic solvent occupies before the degradable polymer precipitates out of the solvent. In certain embodiments, the solid precipitate may comprise particles or particulates of a relatively uniform size. In other embodiments, the solid precipitate may comprise particles or particulates having a variety of sizes, including but not limited to multimodal (e.g., bimodal, trimodal) particle size distributions. The size and/or shape of the solid precipitate may depend on several factors and/or conditions in the formation, including but not limited to the flow rate of the organic solvent, any mechanical forces (e.g., shear) to which the organic solvent is subjected, temperature, pressure, and/or other conditions or phenomena in the formation.

In certain embodiments, the treatment fluids used in the methods and systems of the present disclosure optionally may comprise any number of additional additives. Examples of such additional additives include, but are not limited to, salts, surfactants, acids, particulate additives (e.g., additional particulate diverting agents, bridging agents, fluid loss control additives, proppant particulates, etc.) gas, nitrogen, carbon dioxide, surface modifying agents, tackifying agents, foamers, corrosion inhibitors, scale inhibitors, catalysts, clay control agents, biocides, friction reducers, antifoam agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, the treatment fluid may further comprise one or more breakers, among other reasons, to increase the rate of degradation of the degradable polymer after the solid precipitate has been formed and used. Such breakers should be compatible with but not soluble in the organic solvent and, in some embodiments, may be relatively unreactive at surface conditions. In certain embodiments, the treatment fluid may further comprise one or more plasticizers, among other reasons, to confer certain properties or characteristics to the degradable polymer (e.g., facilitating dissolution or plasticizing of the polymer in the organic solvent, improved processing characteristics during the blending and processing steps, and control and regulation of the sensitivity and degradation of the polymer by moisture). A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the degradable polymer(s) and/or other components of the treatment fluid may be metered directly into the organic solvent(s) to form a treatment fluid. In certain embodiments, the organic solvent(s) may be mixed with the degradable polymer(s) and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

As noted above, in the methods and systems of the present disclosure, the organic solvent carrying the degradable polymer is contacted with an aqueous fluid in order to cause the degradable polymer to form a solid precipitate. Aqueous fluids that may be suitable for use in the methods and systems of the present disclosure may comprise water from any source. For example, the aqueous fluid may be introduced into the formation, or may be naturally occurring or otherwise already present in the formation (e.g., formation water, which may be manipulated or controlled using conformance treatments). Such aqueous fluids may comprise fresh water, salt water (e.g., water containing one or more salts dissolved therein), brine (e.g., saturated salt water), seawater, or any combination thereof. In certain embodiments, the aqueous fluid may further comprise one or more other additives to impart certain properties to that fluid, including but not limited to weighting agents, pH control agents, acids, and the like.

In the methods of the present disclosure, the treatment fluid comprising the degradable polymer may be contacted by the aqueous fluid at some point in time after it is introduced into the subterranean formation. In some embodiments, this may not occur until the treatment fluid reaches the portion of the subterranean formation where the solid precipitate is to be placed and/or used. The timing of the step of contacting the treatment fluid with the aqueous fluid may be controlled and/or delayed by any known method or apparatus. For example, in some embodiments, the aqueous fluid may be already present in the targeted portion of the subterranean formation, and so the treatment fluid would simply contact that aqueous fluid once it reaches that portion of the formation. In other embodiments, the aqueous fluid may be introduced (e.g., pumped or injected) into the subterranean formation at some point in time after the treatment fluid comprising the degradable polymer is introduced, and/or may be separated from physical contact with the treatment fluid (e.g., by one or more spacer fluids, conduits, isolation devices, and/or other equipment).

For example, in some embodiments, the treatment fluid comprising the degradable polymer may be introduced into a well bore penetrating a portion of a subterranean formation, while an aqueous fluid is introduced into a tubing string that is placed in that well bore, with an open end of the tubing string disposed at or near the portion or interval of the well bore where the solid precipitate is desired to be formed. Thus, the tubing string may separate the aqueous fluid from the treatment fluid and prevent the solid precipitate from forming in portions of the well bore uphole of the open end of the tubing string. Alternatively, the treatment fluid comprising the degradable polymer could be introduced into the tubing while the aqueous fluid is introduced into the annular space of the well bore (i.e., the space within the wellbore on the outside of the tubular string), which would still operate to separate the treatment fluid from physical contact with the aqueous fluid until it reaches the location where the solid precipitate is desired to be formed.

In other embodiments, the treatment fluid comprising the degradable polymer may be introduced into the well bore followed by one or more spacer fluids that does not comprise an aqueous fluid, among other reasons, in order to separate the treatment fluid from subsequently introduced aqueous fluid until it reaches the desired location. In some embodiments, the spacer fluid may comprise one or more organic solvents, which may be the same or different from the organic solvents in the treatment fluid. In some embodiments, a treatment of the present disclosure may involve the introduction of alternating intervals or pulses of (i) the treatment fluid that comprises the degradable polymer, (ii) one or more spacer fluids, and (iii) an aqueous fluid, with intervals of (ii) introduced between the intervals of (i) and (iii). In embodiments where the spacer fluid comprises the same organic solvent(s) as the treatment fluid comprising the degradable polymer, this may be accomplished by introducing the organic solvent(s) into the well bore in a relatively continuous stream, while the degradable polymer is metered into the stream of organic solvent in discrete pulses or intervals.

The methods and systems of the present disclosure may be used in the course of a variety of different subterranean treatments, including but not limited to, hydraulic fracturing treatments, acidizing treatments, scale removal treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at or above a pressure sufficient to create or enhance one or more fractures within the subterranean formation (e.g., hydraulic fracturing). In some embodiments, a treatment fluid further comprising an acid (e.g., hydrochloric acid) may be introduced into at least a portion of the subterranean formation, and the acidic treatment fluid may be allowed to interact with (e.g., dissolve) portions of the subterranean formation so as to create one or more voids in the subterranean formation (for example, in acidizing treatments).

In certain embodiments of the present disclosure (e.g., in conjunction with fracturing or acidizing treatments), the treatment fluid comprising the degradable polymer may be contacted with an aqueous fluid at or near perforations in a casing, fractures, wormholes, or other permeable regions of a formation in order to form a solid precipitate comprising the degradable polymer that is then used as a diverting agent to reduce or prevent the flow of another fluid (e.g., a fracturing fluid and/or acidizing fluid) into those regions of a formation and thereby divert the flow of that fluid to another portion (e.g., a less permeable portion) of the formation.

In certain embodiments of the present disclosure, the treatment fluid comprising the degradable polymer may be contacted with an aqueous fluid at or near a permeable region of a formation in order to form a solid precipitate comprising the degradable polymer that is then used as a fluid loss control additive, bridging agent, and/or filter cake that can reduce or prevent fluid leakoff and/or loss of fluid pressure in those portions of the formation. In certain embodiments of the present disclosure, the treatment fluid comprising the degradable polymer may be contacted with an aqueous fluid at or near a selected region of a formation in order to form a solid precipitate comprising the degradable polymer that is then used as a diverting agent or plug that can isolate that portion of the formation for selective treatment (e.g., scale removal, etc.).

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, an optional proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The optional proppant source 40 can include a proppant for combination with the fracturing fluid. However, in some embodiments, the proppant source 40 may be omitted such that the treatment fluid formed using fracturing fluid producing apparatus 20 does not include a significant amount of solid materials/particulates. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In some embodiments, the degradable polymers may be introduced into a fracturing fluid via additive source 70.

The pump and blender system 50 receives the fracturing fluid and combines it with other components, including proppant from the optional proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or optional proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just additives at other times, and combinations of those components at yet other times.

Figure 2:
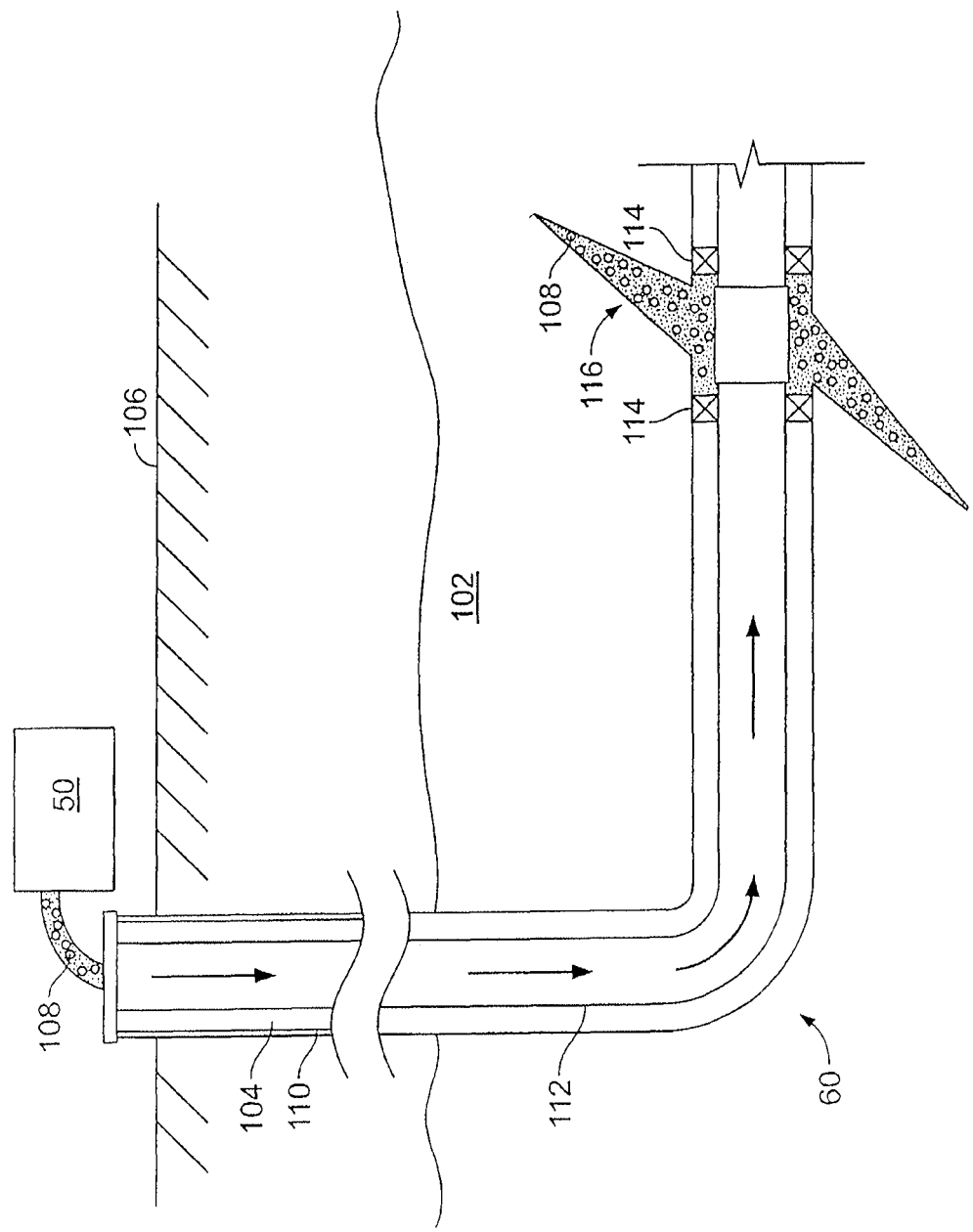
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108, or particulates comprising the degradable polymer precipitating out of the organic solvent, may enter the fractures 116 as shown, or may plug or seal off fractures 116 to reduce or prevent the flow of additional fluid into those areas.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: providing a treatment fluid that comprises at least one organic solvent and one or more degradable polymers, wherein the treatment fluid does not comprise a significant amount of solid material comprising the one or more degradable polymers; introducing the treatment fluid into a well bore penetrating at least a portion of a subterranean formation; and contacting the treatment fluid with one or more aqueous fluids to form a solid precipitate comprising the one or more degradable polymers in the portion of the subterranean formation.

Another embodiment of the present disclosure is a method comprising: providing a first treatment fluid that comprises at least one organic solvent and one or more degradable polymers, wherein the first treatment fluid does not comprise a significant amount of solid material comprising the one or more degradable polymers; introducing the first treatment fluid into a well bore penetrating at least a portion of a subterranean formation; contacting the first treatment fluid with one or more aqueous fluids to form a solid precipitate comprising the one or more degradable polymers in the portion of the subterranean formation; introducing a second treatment fluid into the well bore; and allowing the solid precipitate to divert the second treatment fluid away from the portion of the subterranean formation.

Another embodiment of the present disclosure is a method comprising: providing a fracturing fluid that comprises at least one organic solvent and one or more degradable polymers, wherein the treatment fluid does not comprise a significant amount of solid material comprising the one or more degradable polymers; introducing the fracturing fluid into a well bore penetrating at least a portion of a subterranean formation at or above a pressure sufficient to create or enhance at least one fracture in the subterranean formation; and contacting a portion of the fracturing fluid in the at least one fracture with one or more aqueous fluids to form a solid precipitate comprising the one or more degradable polymers in the fracture.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid that comprises at least one organic solvent and one or more degradable polymers, wherein the treatment fluid comprises 2% weight or less of solid material comprising the one or more degradable polymers based on the volume of the treatment fluid;
   introducing the treatment fluid into a well bore penetrating at least a portion of a subterranean formation; and
   contacting the treatment fluid with one or more aqueous fluids to form a solid precipitate comprising the one or more degradable polymers in the portion of the subterranean formation.

2. The method of claim 1 wherein the treatment fluid does not comprise an aqueous fluid.

3. The method of claim 1 wherein the degradable polymer is dissolved in the organic solvent when the treatment fluid is introduced into the well bore.

4. The method of claim 1 wherein the degradable polymer is present in the treatment fluid in an amount of from about 1% to about 45% by weight of the organic solvent.

5. The method of claim 1 wherein the degradable polymer comprises at least one polymer material selected from the group consisting of: a polysaccharide, chitin, chitosan, a protein, an orthoester, a polyester, a poly(lactide), a poly(glycolide), a poly(6-caprolactone), a poly(hydroxybutyrate), a poly(anhydride), an aliphatic polycarbonate, a poly(orthoester), a poly(amino acid), a poly(ethylene oxide), a polyphosphazene, any derivative thereof, and any combination thereof.

6. The method of claim 1 wherein the degradable polymer is a poly(lactide), a poly(glycolide), any copolymer thereof, or any combination thereof.

7. The method of claim 1 wherein the organic solvent comprises at least one solvent selected from the group consisting of: acetonitrile, dichloromethane, trifluoroacetic acid, dimethylformamide, acetone, chloroform, hexafluoro-2-propanol, dioxane, any derivative thereof, and any combination thereof.

8. The method of claim 1 wherein the solid precipitate is formed in the well bore and forms at least a portion of a filter cake in the well bore.

9. The method of claim 1 wherein the solid precipitate is formed near one or more perforations in a casing string or a liner disposed in the well bore.

10. The method of claim 1 further comprising allowing the solid precipitate to at least partially degrade.

11. The method of claim 1 wherein the aqueous fluid comprises formation water that is present in the subterranean formation.

12. The method of claim 1 further comprising introducing the aqueous fluid into the subterranean formation.

13. A method comprising:
    providing a first treatment fluid that comprises at least one organic solvent and one or more degradable polymers, wherein the first treatment fluid comprises 2% weight or less of solid material comprising the one or more degradable polymers based on the volume of the treatment fluid;
    introducing the first treatment fluid into a well bore penetrating at least a portion of a subterranean formation;
    contacting the first treatment fluid with one or more aqueous fluids to form a solid precipitate comprising the one or more degradable polymers in the portion of the subterranean formation;
    introducing a second treatment fluid into the well bore; and
    allowing the solid precipitate to divert the second treatment fluid away from the portion of the subterranean formation.

14. The method of claim 13 wherein the second treatment fluid is a fracturing fluid, and the second treatment fluid is introduced into the well bore at or above a pressure sufficient to create or enhance at least one fracture in the subterranean formation.

15. The method of claim 13 wherein the second treatment fluid is an acidizing fluid that comprises an acid.

16. The method of claim 13 wherein the first and second treatment fluid are introduced into the well bore using one or more pumps.

17. The method of claim 13 further comprising allowing the solid precipitate to at least partially degrade.

18. The method of claim 13 wherein the degradable polymer is a poly(lactide), a poly(glycolide), any copolymer thereof, or any combination thereof.

19. A method comprising:
    providing a fracturing fluid that comprises at least one organic solvent and one or more degradable polymers, wherein the fracturing fluid comprises 2% weight or less of solid material comprising the one or more degradable polymers based on the volume of the fracturing fluid;
    introducing the fracturing fluid into a well bore penetrating at least a portion of a subterranean formation at or above a pressure sufficient to create or enhance at least one fracture in the subterranean formation; and
    contacting a portion of the fracturing fluid in the at least one fracture with one or more aqueous fluids to form a solid precipitate comprising the one or more degradable polymers in the fracture.

20. The method of claim 19 wherein the degradable polymer is a poly(lactide), a poly(glycolide), any copolymer thereof, or any combination thereof.

* * * * *